US012649338B2

(12) United States Patent
Kim et al.

(10) Patent No.: US 12,649,338 B2
(45) Date of Patent: Jun. 9, 2026

(54) TIRE ASSEMBLY INCLUDING INTEGRAL ANTI-SKID MEMBER

(71) Applicants: HYUNDAI MOTOR COMPANY, Seoul (KR); KIA CORPORATION, Seoul (KR)

(72) Inventors: Eun Sik Kim, Gwangmyeong-si (KR); Ju Ho Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 436 days.

(21) Appl. No.: 18/242,801

(22) Filed: Sep. 6, 2023

(65) Prior Publication Data

US 2024/0375461 A1     Nov. 14, 2024

(30) Foreign Application Priority Data

May 10, 2023    (KR) ......................... 10-2023-0060528

(51) Int. Cl.
B60C 27/06 (2006.01)
B60C 11/18 (2006.01)

(52) U.S. Cl.
CPC .............. B60C 27/06 (2013.01); B60C 11/18 (2013.01); B60C 27/061 (2013.01)

(58) Field of Classification Search
CPC ..... B60C 11/14; B60C 11/1606; B60C 11/18; B60C 11/185; B60C 27/02; B60C 27/023; B60C 27/06; B60C 27/061
See application file for complete search history.

(56) References Cited

U.S. PATENT DOCUMENTS 3,120,255 A * 2/1964 Pellegrino ........... B60C 11/1606
                                                     152/208
3,683,990 A * 8/1972 Detwiler ................. B60C 27/02
                                                     152/225 R

* cited by examiner

*Primary Examiner* — S. Joseph Morano
*Assistant Examiner* — Alex Palmer
(74) *Attorney, Agent, or Firm* — Morgan, Lewis & Bockius LLP

(57)                    ABSTRACT

A tire assembly includes: a wheel connected to a vehicle, and including a first groove formed in the wheel; a tire coupled to the wheel, and including a second groove, connected to the first groove, formed therein; and an anti-skid member including first and second end portions coupled to the wheel, and movably accommodated in the first groove and the second groove, wherein the tire includes a tread contacting with the ground and a sidewall extending from first and second sides of the tread and coupled to the wheel, wherein the tire assembly is configured to transform to a hide state in which at least a portion of the anti-skid member is located inwardly of a surface of the tread or to a pop-up state in which the at least a portion of the anti-skid member protrudes from the surface of the tread.

20 Claims, 8 Drawing Sheets

TIRE ASSEMBLY INCLUDING INTEGRAL ANTI-SKID MEMBER

CROSS-REFERENCE TO RELATED APPLICATION(S)

The present application claims priority to Korean Patent Application No. 10-2023-0060528 filed on May 10, 2023, the entire contents of which is incorporated herein for all purposes by this reference.

BACKGROUND OF THE PRESENT DISCLOSURE

Field of the Present Disclosure

The present disclosure relates to a tire assembly including an integral anti-skid member, and more particularly, to a tire assembly in which the anti-skid member is integrally provided with a tire.

Description of Related Art

When a vehicle drives on a snowy or icy road, the vehicle may skid and an incidence of various accidents may increase. To prevent the vehicle from skidding on snowy or icy roads, snow chains may be provided on a tire to increase frictional force between the tire and a road surface, improving a vehicle's driving performance and securing safety. In general, when snow chains are used, snow chains are separately purchased and stored, and when necessary, a user installs snow chains on a tire.

A snow chain is heavy, and a process of being provided on and removed from a tire is very inconvenient and cumbersome. For example, there is a problem in that a ladder-type snow chain, which is commonly used, is not easy to be installed and requires an operator's skill, because it should be spread out in front of a tire of a vehicle, and then slightly move the vehicle forward, to fix both end portions thereof. Accordingly, a technology that can more easily allow for use of a snow chain is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a tire assembly integrally provided with an anti-skid member to eliminate inconvenience of installing and removing a snow chain (hereinafter, an anti-skid member) on and from a tire.

An aspect of the present disclosure is to provide a tire assembly configured for normal driving by hiding an anti-skid member in normal driving conditions, while protruding the anti-skid member when necessary, by moving the anti-skid member through a driver operation of pressing a button in a vehicle.

According to an aspect of the present disclosure, a tire assembly includes: a wheel connected to a vehicle, and including a first groove formed in the wheel; a tire coupled to the wheel, and including a second groove, connected to the first groove, formed therein; and an anti-skid member including first and second end portions coupled to the wheel, and movably accommodated in the first groove and the second groove, wherein the tire includes a tread contacting with the ground and a sidewall extending from first and second sides of the tread and coupled to the wheel, wherein the tire assembly is configured to transform to a hide state in which at least a portion of the anti-skid member is located inwardly of a surface of the tread or to a pop-up state in which the at least a portion of the anti-skid member protrudes from the surface of the tread.

In an exemplary embodiment of the present disclosure, the anti-skid member may include a variable portion accommodated in the first groove and a contact portion coupled to the variable portion and accommodated in the second groove, and the variable portion may include a shape memory alloy.

In an exemplary embodiment of the present disclosure, the contact portion may contact with the ground when in the pop-up state.

In an exemplary embodiment of the present disclosure, the contact portion may be formed using at least one of a plastic material, a non-woven fabric material, and a metal material.

In an exemplary embodiment of the present disclosure, the variable portion may include a structure in which a first end portion thereof is fixed to the wheel and a second end portion thereof, opposite to the first end portion, is coupled to the contact portion.

In an exemplary embodiment of the present disclosure, the contact portion may include a structure in which the other end portion, opposite to one end portion coupled to the second end portion of the variable portion, is fixed to the wheel.

In an exemplary embodiment of the present disclosure, the sidewall of the tire may include a first sidewall extending from a first side of the tread and a second sidewall extending from a second side of the tread, the second groove may extend to across the first sidewall, the tread, and the second sidewall, and a partial section of the second groove formed in the first sidewall may be connected to the first groove.

In an exemplary embodiment of the present disclosure, the contact portion may include a first portion accommodated in a first section of the second groove formed in the tread, a second portion accommodated in a second section of the second groove formed in the first sidewall, and a third portion accommodated in a third section of the second groove formed in the second sidewall.

In an exemplary embodiment of the present disclosure, in the hide state, the second portion of the contact portion may be accommodated inwardly from the surface of the tread by a first distance, in the pop-up state, the second portion of the contact portion may protrude outwardly from the surface of the tread by a second distance.

In an exemplary embodiment of the present disclosure, a shape of the variable portion may be transformed or restored based on whether an electrical signal is applied, and the contact portion may be provided to move with respect to the tire as the shape of the variable portion is transformed or restored.

In an exemplary embodiment of the present disclosure, in the hide state, an electrical signal is cut off, so that the variable portion is transformed to a predetermined shape by external force, and in the pop-up state, an electrical signal is applied to overcome the external force, the variable portion is restored to an original shape thereof, and at least a portion of the variable portion may move the contact portion while at least a portion of the variable portion moves in a direction away from a central axis of the wheel along the first groove by the restoration of the shape thereof.

In an exemplary embodiment of the present disclosure, an elastic member provided to apply the external force to the variable portion may be further included, wherein the wheel may be formed with an accommodating groove connected to the second groove and accommodating the elastic member, and the elastic member may apply elastic force in a direction of the central axis.

In an exemplary embodiment of the present disclosure, the first groove may be formed in a shape corresponding to an original shape of the variable portion to support the variable portion in the pop-up state.

In an exemplary embodiment of the present disclosure, a slip ring provided to transmit an electrical signal to the variable portion may be further included, wherein the slip ring may be fixed to the wheel and connected to the contact portion.

In an exemplary embodiment of the present disclosure, a fixing ring for fixing the contact portion to the wheel may be further included, wherein the fixing ring may be fitted and coupled to the inside of the wheel, and a portion of the contact portion may be press-fitted between the fixing ring and the wheel.

In an exemplary embodiment of the present disclosure, a cover detachably coupled to the wheel may be further included, and the cover may be provided to cover the variable portion and the second groove.

In an exemplary embodiment of the present disclosure, the anti-skid member may be comprised in plural, and the first groove and the second groove may be formed in a number corresponding to the anti-skid member.

According to an aspect of the present disclosure, a vehicle includes: an axle; and a tire assembly coupled to the axle, wherein the tire assembly includes: a wheel connected to the axle, and including a first groove formed in the wheel; a tire coupled to the wheel, and including a second groove, connected to the first groove, formed therein; and an anti-skid member including first and second end portions coupled to the wheel, and movably accommodated in the first groove and the second groove, wherein the tire includes a tread contacting with the ground and a sidewall extending from first and second sides of the tread and coupled to the wheel, wherein the tire assembly is configured to transform to a hide state in which at least a portion of the anti-skid member is located inwardly of a surface of the tread or to a pop-up state in which the at least a portion of the anti-skid member protrudes from the surface of the tread.

In an exemplary embodiment of the present disclosure, a control unit of controlling state transformation of the tire assembly in response to a driver operation may be further included.

In an exemplary embodiment of the present disclosure, the anti-skid member includes a variable portion accommodated in the first groove and including a shape memory alloy, and a contact portion coupled to the variable portion and accommodated in the second groove, the control unit is electrically connected to the variable portion and is provided to apply an electrical signal to the variable portion, a shape of the variable portion is transformed or restored based on whether an electrical signal is applied to the variable portion, and the contact portion may be provided to move with respect to the tire as the shape of the variable portion is transformed or restored.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

The above and other aspects, features, and advantages of the present disclosure will be more clearly understood from the following detailed description.

Figure 1:
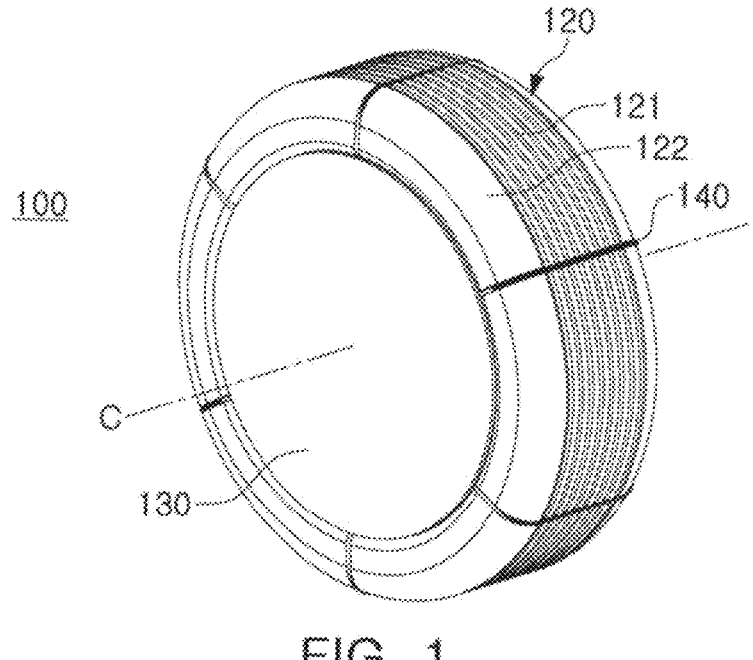
FIG. 1 is a perspective view of a tire assembly according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the contrary, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, the present disclosure will be described in detail with reference to the accompanying drawings. In adding reference numerals to elements of each of the drawings, although the same elements are illustrated in other drawings, like reference numerals may refer to like elements. Because the present disclosure can make various changes and have various exemplary embodiments of the present disclosure, specific embodiments are illustrated in the drawings and described in detail. However, this is not intended to limit the present disclosure to specific embodiments, and should be understood to include all modifications, equivalents, and substitutes included in the spirit and scope of the present disclosure.

Terms such as "first," "second," and the like, may be used to describe various components, but the components should not be limited by the terms. These terms are only used for distinguishing one component from another component. For example, a first element may be termed a second element, and similarly, a second element may be termed a first element, without departing from the scope of the present disclosure. The term 'and/or' includes a combination of a plurality of related recited items or any one of a plurality of related recited items.

Terms used in The present application are only used to describe predetermined embodiments, and are not intended to limit the present disclosure. Singular expressions include plural expressions unless the context thereof is clearly dictated otherwise. In the present application, terms such as "comprise" or "having" are intended to designate that there is a feature, number, step, operation, component, portion, or combination thereof described in the specification, but one or more other features It should be understood that it does not preclude the possibility of the presence of addition of numbers, steps, operations, components, parts, or combinations thereof.

Unless defined otherwise, all terms used herein, including technical or scientific terms, include the same meaning as commonly understood by one of ordinary skill in the art to which the present disclosure belongs. Terms such as those defined in commonly used dictionaries should be interpreted as including a meaning consistent with the meaning in the context of the related art, and unless explicitly defined in the present application, they should not be interpreted in an ideal or excessively formal meaning.

Hereinafter, various embodiments of the present disclosure will be described with reference to the drawings.

Figure 2:
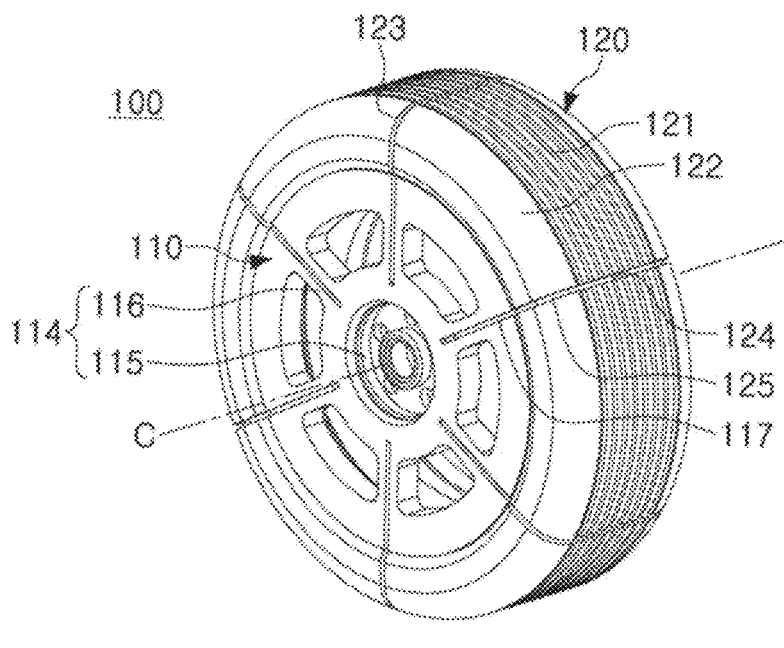
FIG. 2 is a perspective view of some components of a tire assembly according to an exemplary embodiment of the present disclosure.
Figure 3:
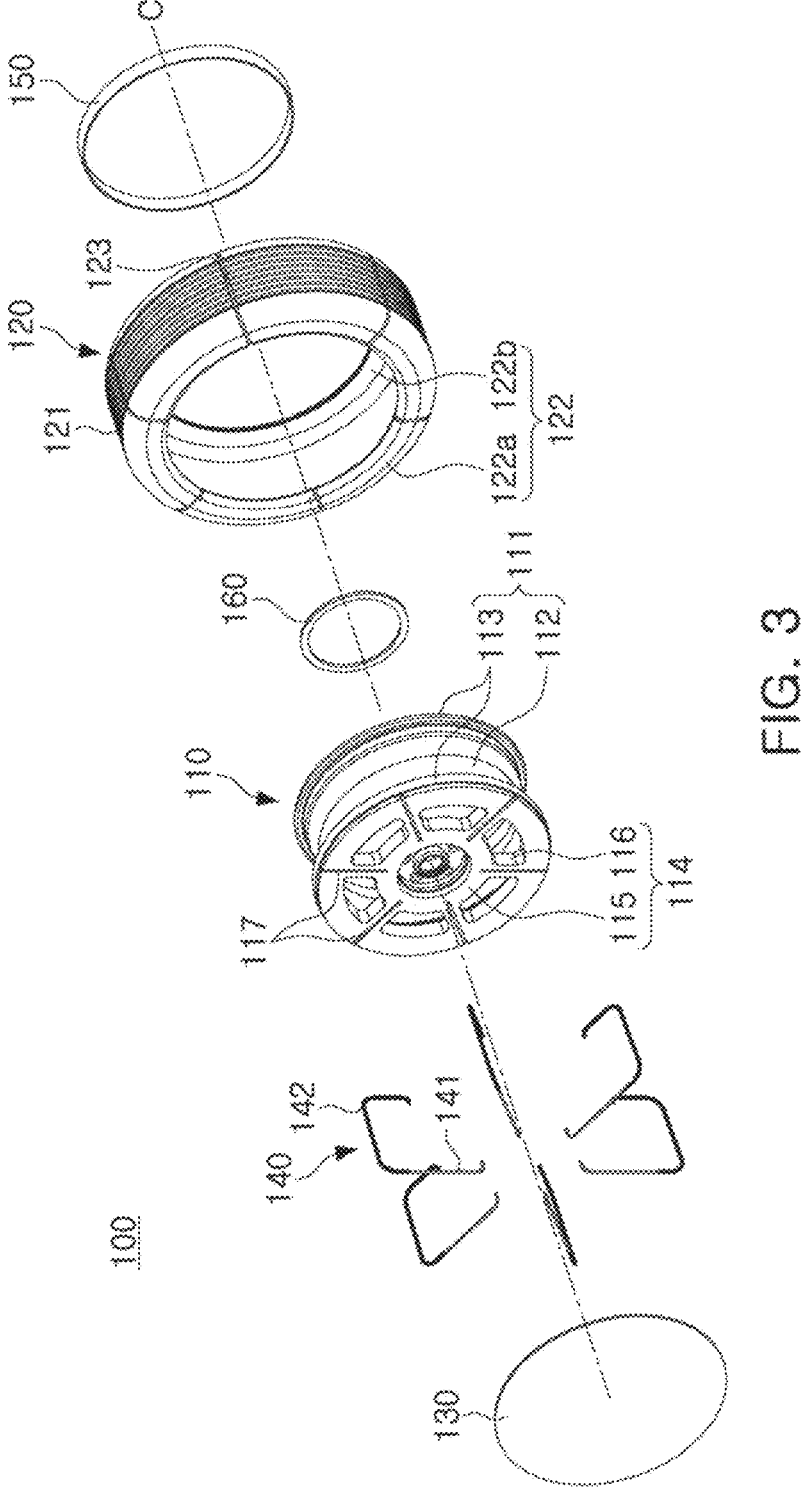
FIG. 3 is an exploded perspective view of a tire assembly according to an exemplary embodiment of the present disclosure.

FIG. 1 is a perspective view of a tire assembly 100 according to an exemplary embodiment of the present disclosure. FIG. 2 is a perspective view of some components of a tire assembly 100 according to an exemplary embodiment of the present disclosure. FIG. 3 is an exploded perspective view of a tire assembly 100 according to an exemplary embodiment of the present disclosure.

FIG. 2 is a perspective view of the tire assembly 100 shown in FIG. 1 in which a cover 130 and an anti-skid member 140 are omitted, and FIG. 3 is a perspective view of the tire assembly 100 shown in FIG. 1 in an exploded state.

The tire assembly 100 according to an exemplary embodiment of the present disclosure is a device for a vehicle tire applied to a vehicle, wherein the vehicle refers to various vehicles moving objects such as people, animals, objects, or the like, from a departure point to a destination. These vehicles are not limited to vehicles driving roads or tracks.

Referring to FIG. 1, FIG. 2, and FIG. 3, the tire assembly 100 according to various exemplary embodiments of the present disclosure may include a wheel 110, a tire 120, a cover 130, an anti-skid member 140, a fixing ring 150, and a slip ring 160.

The wheel 110 is connected to an axle of a vehicle to couple the tire assembly 100 to the vehicle, and a tire 120 may be provided on the wheel 110. The wheel 110 may include a wheel rim 111 on (to) which the tire 120 is provided (or coupled) and a wheel disc 114 extending from the wheel rim 111 and connected to an axle.

The wheel rim 111 may include a base 112 extending in a circumferential direction to include a predetermined width and formed to include a hollow shape, and a flange 113 formed on both edge portions of the base 112 and coupled to the tire 120. When the wheel 110 is connected to a vehicle, an axle of the vehicle may be disposed inside the base 112 of the wheel rim 111.

The wheel disk 114 may include a hub 115 disposed inside the wheel rim 111 and fixed to the axle of the vehicle and a plurality of spokes 116 radially connecting the hub 115 and the flange 113. The hub 114 is a center portion of the wheel disk 114 or the wheel 110, and as the axle is connected to a connection hole formed in the hub 115 using a fastener (e.g., hub bolts and hub nuts), the tire assembly 100 may be coupled to a vehicle. A plurality of openings may be formed in the wheel disk 114 as the plurality of spokes 116 radially extend from the hub 115 toward the flange 113 and are spaced from each other.

The wheel 110 may include a shape, open in a rear direction and partially blocked by the wheel disk 114 in a front direction thereof. In the present specification, the front direction and the rear direction are directions parallel to a central axis (or a rotation axis) (C), and the front direction is defined as a direction of a side on which the wheel disk 114 is disposed, based on the wheel rim 111, and the rear direction is defined as an opposite direction of the front direction. A shape and structure of the wheel 110 including the wheel rim 111 and the wheel disk 114 are not limited to the exemplary embodiment described above, which is a well-known technology in the related art, so that a detailed description thereof will be omitted.

In the wheel 110, a first groove 117 in which a portion of the anti-skid member 140 is disposed may be formed in the wheel disk 114. The first groove 117 may be formed on at least a portion of the plurality of spokes 116 of the wheel disk 114, and may be comprised in plural corresponding to the number of the anti-skid members 140. For example, the first groove 117 may be recessed by a predetermined depth toward a rear side on a surface facing the front side of the wheel disk 114. The first groove 117 may extend radially from the center portion of the wheel disk 114, and may be formed to include a straight line shape including a predetermined length. A variable portion 141 of the anti-skid member 140 may be disposed in the first groove 117. For example, the variable portion 141 may be movably accommodated or inserted into the first groove 117 along the first groove 117.

The tire 120 may be provided on the wheel 110. For example, the tire 120 may be coupled to the flange 113 of the wheel rim 111. Because the tire 120 determines driving force of a vehicle according to a coefficient of friction of a road surface, the tire 120 may be formed of rubber, which is a compressible material, so that it can easily adhere to the road surface and generate good friction.

The tire 120 may include a tread 121 and a sidewall 122. The tread 121 is a portion in contact with a road surface, and may be formed thicker than other portions of the tire 120 to increase durability. Various patterns of tread grooves (e.g., tire grooves) may be formed in the tread 121 to increase frictional force between the tire 120 and the road surface. The sidewall 122 is a portion, next to a side portion of the tire 120, and may extend from an edge portion of the tread 121 toward the wheel 110. For example, the sidewall 122 may extend from both edge portions of the tread 121 toward the central axis C to face front and rear directions of the tire 120. The sidewall 122 may include a first sidewall 122*a* extending from one side of the tread 121 to face a front direction, and a second sidewall 122*b* extending from the other side of the tread 121 to face a rear direction thereof.

A surface of the tire 120 may include a second groove 123 in which a portion of the anti-skid member 140 is disposed formed therein. The second groove 123 may be formed to across the tread 121 and the sidewall 122, and may be comprised in plural corresponding to the number of anti-skid members 140. For example, the second groove 123 may be recessed to a predetermined depth on the surface of the tread 121 and the sidewall 122. The second groove 123 may extend from the first sidewall 122*a* through the tread 121 to the second sidewall 122*b*. For example, the second groove 123 may include a shape in which a first section 124 formed in the tread 121, a second section 125 formed in the first sidewall 122*a*, and a third section (e.g., see the third section 126 of FIG. 4A) formed in the second sidewall 122*b*, are connected. A contact portion 142 of the anti-skid member 140 may be disposed in the second groove 123. For example, the contact portion 142 may move along the second groove 123 and be accommodated or inserted into the second groove 123 to protrude from the second groove 123. The second groove 123 may be formed in a shape corresponding to the contact portion 142 of the anti-skid member 140. According to an exemplary embodiment of the present disclosure, a partial section (e.g., the first section 124) of the second groove 123 formed in the tread 121 may provide a function of increasing frictional force between the tire 120 and the road surface, together with the tread groove described above.

The tire 120 may be coupled to the wheel 110 so that the second groove 123 is aligned with the first groove 117. As illustrated in FIG. 2, in a state in which the tire 120 is assembled to the wheel 110, the first groove 117 formed in the wheel 110 and the second groove 123 formed in the tire 120 may be connected to each other. For example, the first groove 117 may be connected to a partial section of the second groove 123 formed on the first sidewall 122*a*, and thus the first groove 117 and the second groove 123 may be aligned to be continuously connected.

The cover 130 may be coupled to the wheel 110. For example, the cover 130 may be detachably coupled to the wheel disk 114 of the wheel 110 (e.g., a snap-fit method), and cover the wheel disk 114, by covering the wheel disk 114, the cover 130 may cover and protect a surface of the wheel disk 114 and the variable portion 141 accommodated in the first groove 117 from being exposed to an exterior of the tire assembly 100.

The anti-slip member 140 may prevent the tire 120 from slipping when the vehicle drives on snowy or icy roads. For example, the anti-skid member 140 may function as a snow chain. The anti-skid member 140 may be comprised in plural. The anti-skid member 140 may include a variable portion 141 and a contact portion (e.g., the ground contact portion) 142 coupled to the variable portion 141. The anti-skid member 140 may be coupled to the wheel 110 by fixing one end portion of the variable portion 141 and one end portion of the contact portion 142 to the wheel 110. The variable portion 141 may be accommodated in the first groove 117 of the wheel 110, and the contact portion 142 may be accommodated in the second groove 123 of the tire 120. The variable portion 141 may be formed using a shape-memory alloy. For example, even when the variable portion 141 is transformed to a different shape, the shape thereof may be restored to the shape before the transformation by heating. The anti-skid member 140 may move with respect to the wheel 110 and the tire 120 based on an operation in which the shape of the variable portion 141 is transformed and restored. For example, the variable portion 141 may function as a driving portion (actuator) for moving the contact portion 142. When the contact portion 142 protrudes from the surface of the tire 120, it may contact with the ground to prevent the tire 120 from slipping. The contact portion 142 may be formed using at least one of a plastic material, a steel material, a non-woven fabric material, or a metal material, but the present disclosure is not limited thereto.

The anti-skid member 140 may protrude from a surface of the tire 120 or may be located inwardly of the surface of the tire 120, by being moved by a vehicle driver operation. According to an exemplary embodiment of the present disclosure, because the snow chains (i.e., the anti-skid member 140) are integrally provided with the tire assembly 100, the driver may easily use the snow chains by operating the same in response to external environments without a process of installing/separating the snow chains on from the tire assembly 100. A detailed description of the operation in which the anti-skid member 140 is moved by the transformation restoration of the variable portion 141 will be described later.

The fixing ring 150 is a component for fixing the contact portion 142 of the anti-skid member 140 to the wheel 110, and may be coupled to the wheel 110. The fixing ring 150 may be formed in an annular shape corresponding to the wheel 110. For example, the fixing ring 150 may be coupled to the inside of the wheel 110 to overlap with one end portion of the contact portion 142 in a state in which one end portion of the contact portion 142 is coupled to the inside of the wheel 110, stably fixing the contact portion 142 to the wheel 110. According to various embodiments of the present disclosure, the fixing ring 150 may be omitted.

The slip ring 160 is a component for transmitting an electrical signal to the variable portion 141 of the anti-skid member 140, and may be coupled to the wheel 110. The slip ring 160 may be coupled to the wheel disk 114 inside the wheel rim 111. The slip ring 160 may be connected while in contact with one end portion of the variable portion 141. The slip ring 160 may rotate integrally with the wheel 110. For example, the slip ring 160 may include a hollow slip ring. The slip ring 160 may restore the transformed variable portion 141 to an original shape thereof by increasing a temperature of the variable portion 141 by transmitting current to the variable portion 141. The slip ring 160 is a component for transmitting electric power and/or signals from a fixed portion to a rotation portion without twisting wires, may be referred to as a rotation connector, and may include a contact slip ring and a non-contact slip ring. Because the slip ring 160 is a known technology widely known in the art, a detailed description thereof will be omitted.

Figures 4A, 4B:
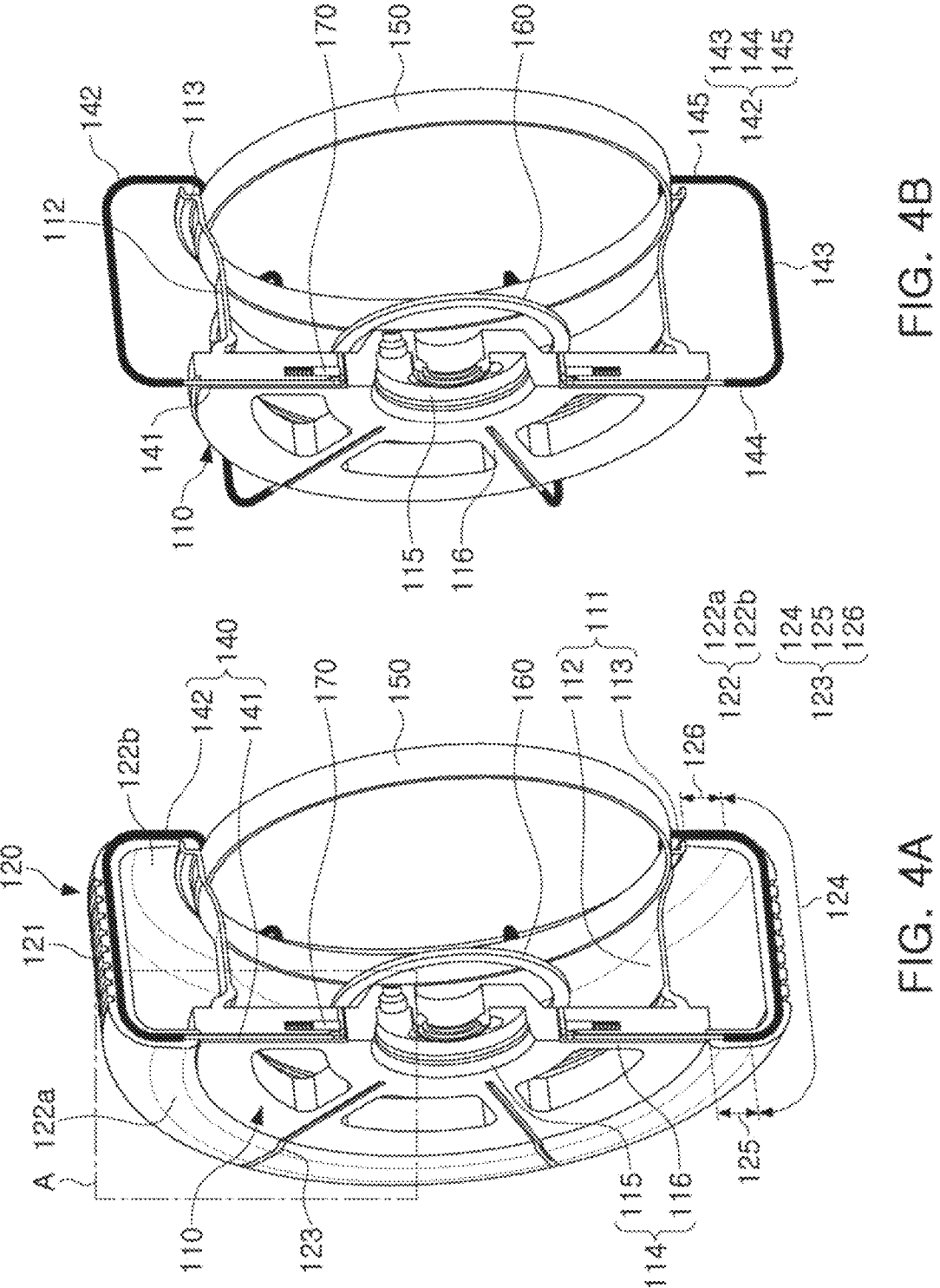
FIG. 4A and FIG. 4B are cross-sectional perspective views of some components of a tire assembly according to an exemplary embodiment of the present disclosure.
Figure 5:
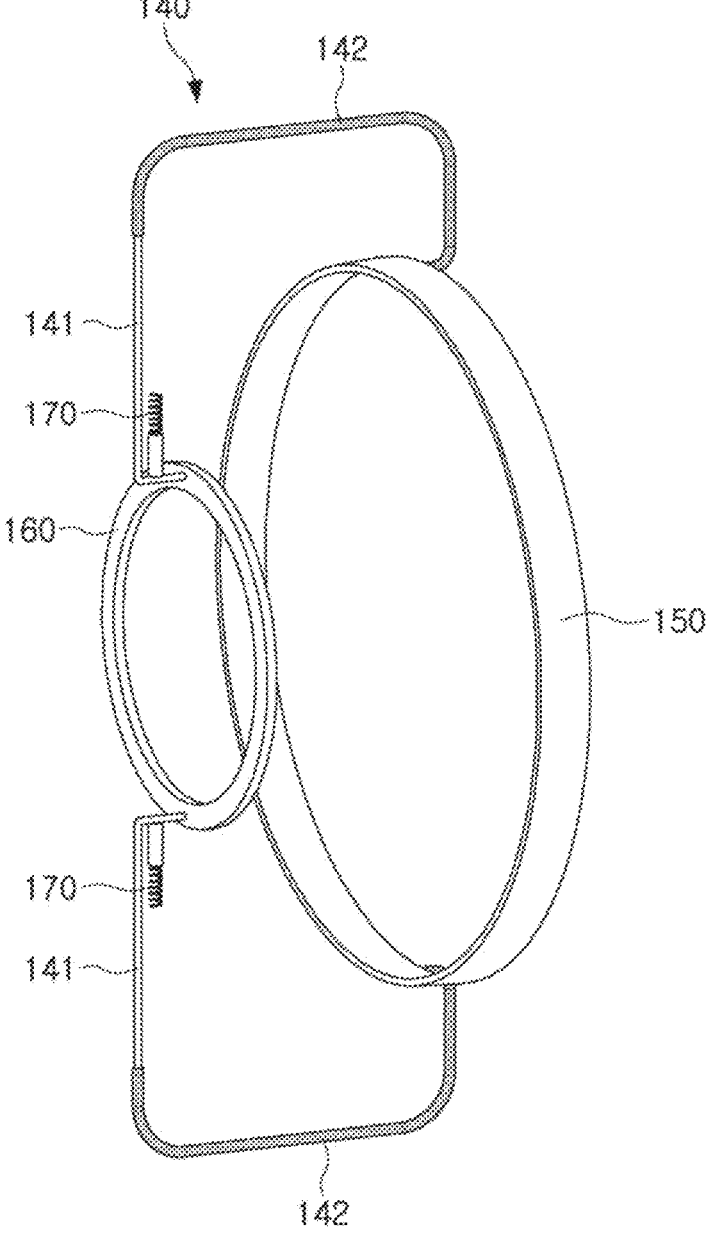
FIG. 5 is a view exemplarily illustrating a dispositional structure of an anti-skid member, a fixing ring, a slip ring, and an elastic member in a tire assembly according to an exemplary embodiment of the present disclosure.
Figures 6A, 6B, 6C:
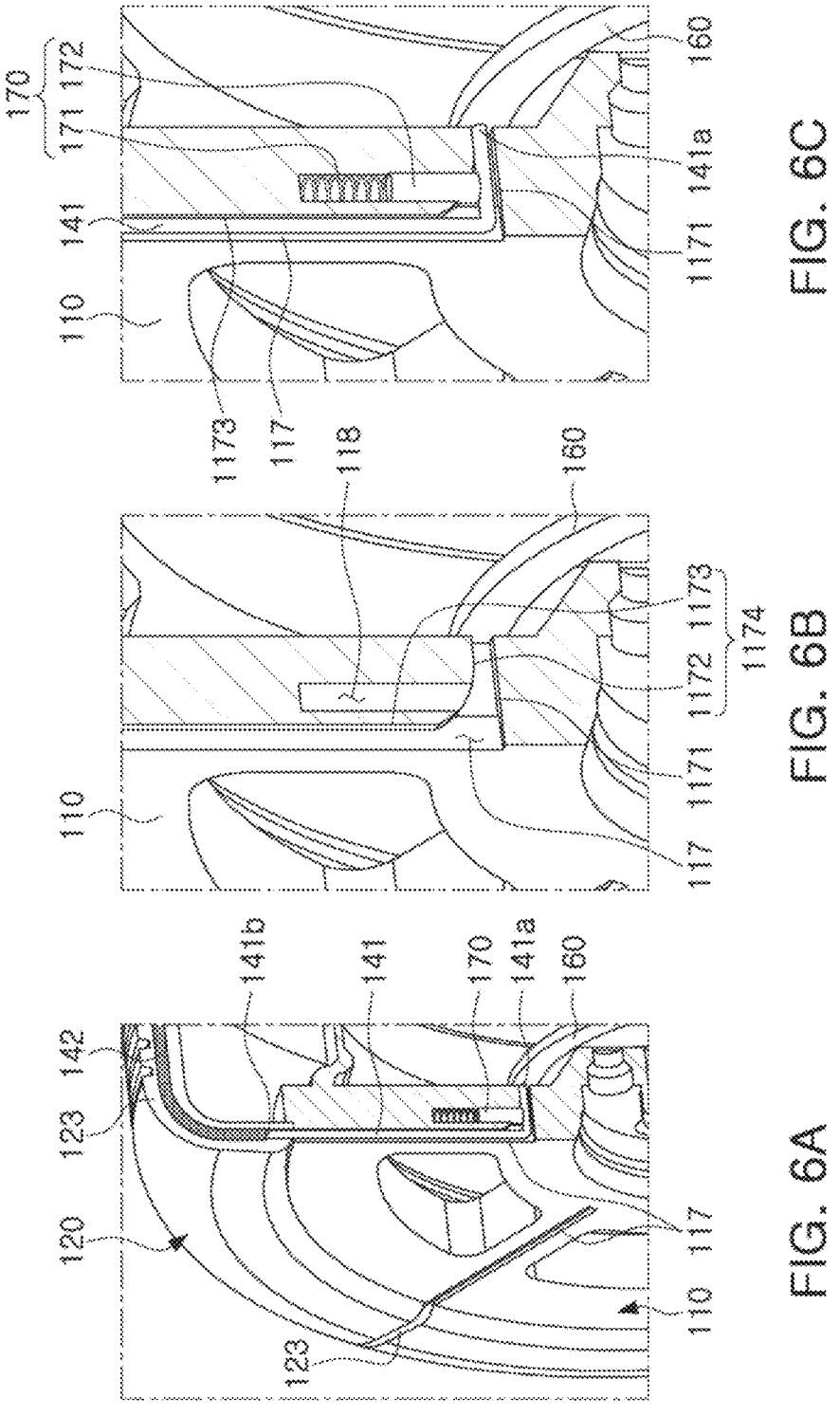
FIG. 6A, FIG. 6B and FIG. 6C are views exemplarily illustrating a dispositional structure of a variable portion, a wheel, and an elastic member in a tire assembly according to an exemplary embodiment of the present disclosure.

FIG. 4A and FIG. 4B are cross-sectional perspective views of some components of a tire assembly 100 according to an exemplary embodiment of the present disclosure. FIG. 5 is a view exemplarily illustrating a dispositional structure of an anti-skid member 140, a fixing ring 150, a slip ring 160, and an elastic member 170 in the tire assembly 100 according to various exemplary embodiments of the present disclosure. FIG. 6A, FIG. 6B and FIG. 6C are views exemplarily illustrating a dispositional structure of a variable portion 141, a wheel 110, and an elastic member 170 in the tire assembly 100 according to an exemplary embodiment of the present disclosure.

FIG. 4B is a view in which the tire 120 is omitted from FIG. 4A, and FIG. 5 is a view in which the wheel 110 is omitted from FIG. 4B. FIG. 6A is an enlarged view of portion A of FIG. 4A, FIG. 6B illustrates a state before the anti-skid member 140 and the elastic member 170 are coupled in FIG. 6A, and FIG. 6C illustrates a state in which the elastic member 170 is coupled in FIG. 6B. FIGS. 4A to 6C are views for illustrating a configuration of the anti-skid member 140 and a structure in which the anti-skid member 140 is connected to the wheel 110 and the tire 120.

Referring to FIGS. 4A to 6C, the tire assembly 100 according to various exemplary embodiments of the present disclosure may include a wheel 110, a tire 120, an anti-skid member 140, a fixing ring 150, a slip ring 160, and an elastic member 170. In the following description of FIGS. 4A to 6C, descriptions overlapping those of FIG. 1, FIG. 2, and FIG. 3 will be omitted.

The wheel 110 may include a first groove 117 in which the variable portion 141 of the anti-skid member 140 is disposed and an accommodating groove 118 in which the elastic member 170 is disposed. For example, the first groove 117 and the accommodating groove 118 may be formed in a spoke 116 of the wheel disk 114. A side surface 1171 and a bottom surface 1174 of the first groove 117 may be in contact with the variable portion 141 to support the variable portion 141. The bottom surface 1174 of the first groove 117 may include a curved portion 1172 and a flat portion 1173, continuously formed, and the side surface 1171 of the first groove 117 may be formed to face the curved portion 1172 of the bottom surface 1174 and may be perpendicular to the flat portion 1173. The accommodating groove 118 may be connected to the first groove 117. The accommodation groove 118 may be formed through a portion of the bottom surface 1174 of the first groove 117. For example, the accommodating groove 118 may be recessed to be parallel to the flat portion 1173 from the curved portion 1172 of the first groove 117. An elastic member 170 may be movably accommodated in the accommodating groove 118.

The tire 120 may be provided on the wheel 110 by coupling a first sidewall 122a and a second sidewall 122b to both flanges 113 of the wheel rim 111, respectively. The tire 120 may include a second groove 123 in which the contact portion 142 of the anti-skid member 140 is accommodated in the tread 121 formed therein. The second groove 123 may include a first section 124 formed on a surface of the tread 121, a second section 125 extending from one end portion (e.g., a front end) of the first section 124 and formed on the first sidewall 122, and a third section 126 extending from the other end portion (e.g., a rear end) of the first section 124 and formed on the second sidewall 122b. For example, the first section 124, the second section 125, and the third section 126 may be continuously formed, and the second section 125 and the third section 126 may extend toward the wheel 110 from both end portions of the first section 124. When the tire 120 is provided on the wheel 110, the second section 125 of the second groove 123 may be aligned with the first groove 117.

The anti-skid member 140 may include a variable portion 141 disposed in the first groove 117 of the wheel 110 and a contact portion 142 coupled to the variable portion 141 and disposed in the second groove 123 of the tire 120. The variable portion 141 and the contact portion 142 may be coupled in various ways. For example, the variable portion 141 and the contact portion 142 may be coupled through bonding, forced press-fitting, screw coupling, or riveting, but the coupling method is not limited thereto.

The variable portion 141 may be accommodated in the first groove 117, and may contact and be supported by the bottom surface 1174 and the side surface 1171 of the first groove 117. A first end portion 141a of the variable portion 141 may be coupled to the wheel 110 and/or the slip ring 160, and a second end portion 141b may be coupled to the contact portion 142. For example, the first end portion 141a of the variable portion 141 may be directly fixed to the slip ring 160 coupled to the wheel 110, or contact (or electrically contact) the slip ring 160 in a state of being directly fixed to the wheel 110. According to various exemplary embodiments of the present disclosure, the slip ring 160 may be electrically connected to a control unit (e.g., the control unit CU of FIG. 7) of the vehicle to transmit an electrical signal to the variable portion 141. For example, the control unit of the vehicle may apply current to the variable portion 141 through the slip ring 160.

As the variable portion 141 formed of a shape memory alloy is pressed by the elastic member 170 in a low-temperature state where no current is applied, one portion thereof may contact with the side surface 1171 of the first groove, and the other portion thereof may contact with the flat portion 1173 of the bottom surface 1174. For example, FIG. 4A and FIG. 4B, FIG. 5 and FIG. 6A and FIG. 6B illustrate a state in which the variable portion 141 is transformed by elastic force of the elastic member 170 as current is not applied to the variable portion 141. When current is applied, the variable portion 141 may be restored to an original shape thereof, and may contact with an entire bottom surface 1174 of the first groove 117 (e.g., a carved portion 1172 and a flat portion 1173). For example, the bottom surface 1174 of the first groove 117 may be formed in a shape corresponding to the original shape of the variable portion 141. The transformation/restoration operation of the variable portion 141 will be described in more detail with reference to FIG. 7 and FIG. 8 below.

The contact portion 142 may be accommodated in the second groove 123, and coupled to a second end portion 141b of the variable portion 141 and a wheel 110. One end portion of the contact portion 142 may be coupled to the second end portion 141b of the variable portion 141, and the other end portion of the contact portion 142 may be coupled to the wheel 110. For example, the other end portion of the contact portion 142 may be fixed to the wheel 110 through various coupling methods including bonding or bolting.

The contact portion 142 may include a first portion 143 disposed in a first section 124 of the second groove 123, a second portion 144 extending from one end portion of the first portion 143 and disposed in a second section 125 of the second groove 123, and a third portion 145 extending from the other end portion of the first portion 143 and disposed in a third section 126 of the second groove 123. The contact portion 142 and the second groove 123 may be formed to correspond to each other. The second portion 144 of the contact portion 142 may be fixed to the variable portion 141, and the third portion 145 of the contact portion 142 may be fixed to the wheel 110. The contact portion 142 may be stably fixed to the wheel 110 through a fixing ring 150. For example, the third portion 145 of the contact portion 142 may be coupled to an internal surface of a wheel rim 111 (or an internal surface of a base 112), and the fixing ring 150 may be fitted and coupled to the internal surface of the wheel rim 111 so that the third portion 145 is press-fitted between the fixing ring 150 and the wheel rim 111. The fixing ring 150 may firmly fix the contact portion 142 to the wheel 110.

The elastic member 170 may be accommodated in the receiving groove 118 of the wheel 110. The elastic member 170 may change a shape of the variable portion 141 by applying elastic force to the variable portion 141 of the anti-skid member 140. The elastic member 170 may include a spring 171 providing elastic force and a rod 172 coupled to the spring 171 and contacting with the variable portion 141. The elastic member 170 may generate compression or tension in the spring 171 based on whether current is applied to the variable portion 141. The configuration of the elastic member 170 is not limited to the illustrated exemplary embodiment of the present disclosure. According to various exemplary embodiments of the present disclosure, the elastic member 170 may be configured by omitting the rod 172.

Figure 7:
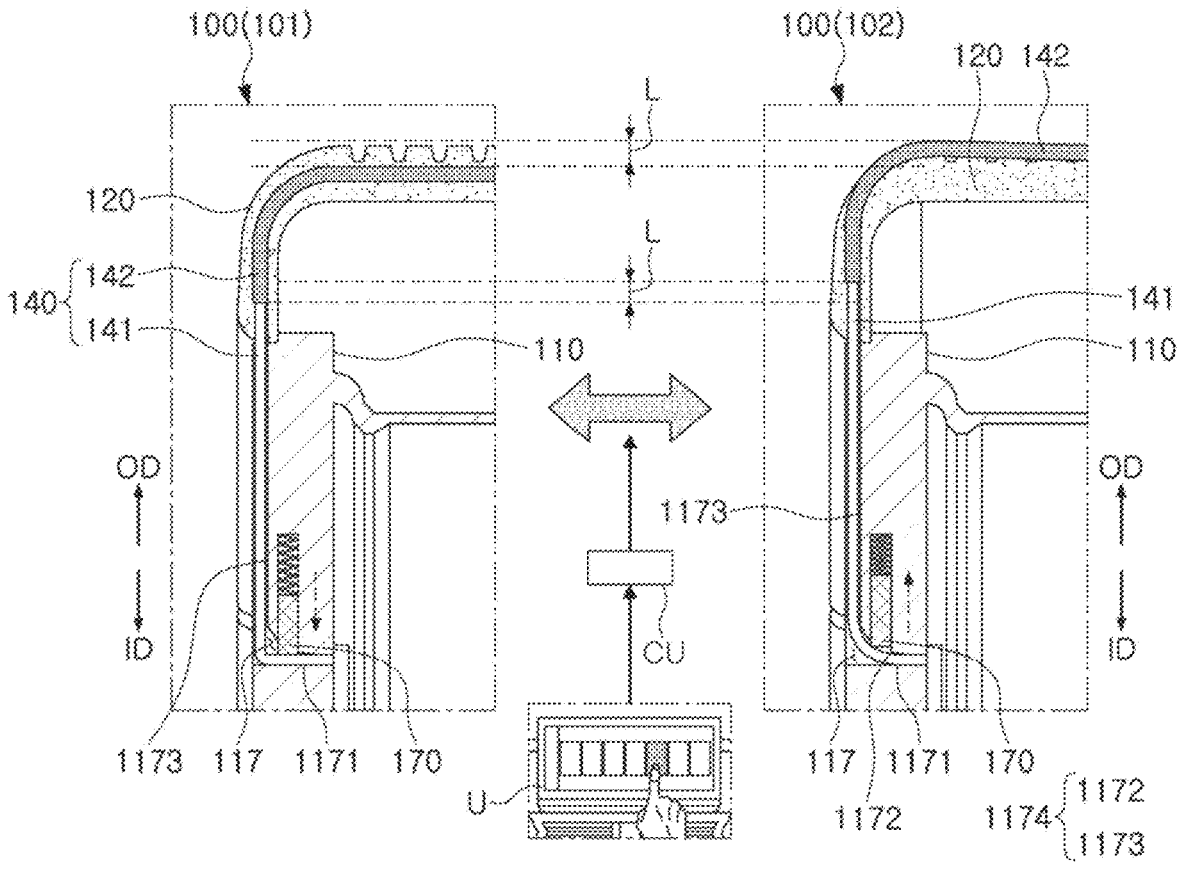
FIG. 7 is a view exemplarily illustrating an operation of moving an anti-skid member of a tire assembly an exemplary embodiment of the present disclosure.
Figure 8:
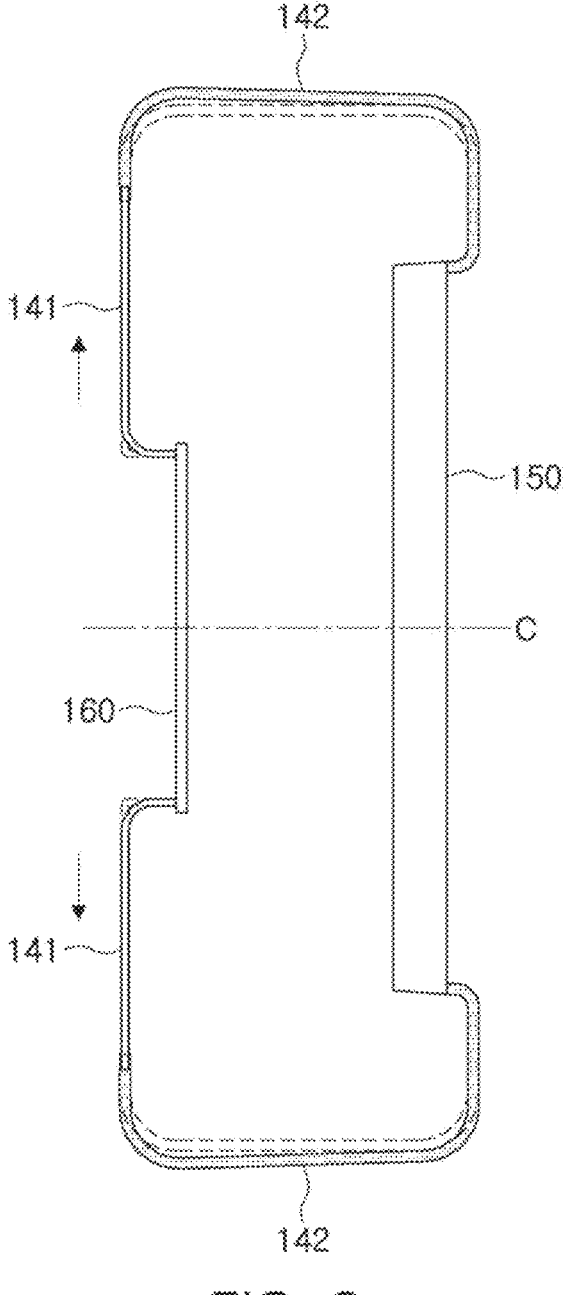
FIG. 8 is a view exemplarily illustrating an operation of moving an anti-skid member of a tire assembly according to an exemplary embodiment of the present disclosure.

FIG. 7 is a diagram illustrating an operation of moving an anti-skid member 140 of a tire assembly 100 according to an exemplary embodiment of the present disclosure. FIG. 8 is a diagram illustrating an operation of moving an anti-skid member 140 of a tire assembly 100 according to an exemplary embodiment of the present disclosure.

Referring to FIGS. 7 and 8, the tire assembly 100 according to various exemplary embodiments of the present disclosure may be transformed to a state in which the anti-skid member 140 is located inside the tire 120 and the anti-skid member 140 protrudes from the tire 120, based on a user (driver) operation U.

Hereinafter, in describing FIGS. 7 and 8, the tire assembly in a state in which the anti-skid member 140 is located inside the tire 120 is defined as a hide state (hidden state) 101, and the tire assembly 100 in a state in which the anti-skid member 140 protrudes from the tire 120 is defined as a pop-up state 102. According to various exemplary embodiments of the present disclosure, the hide state 101 may be referred to as a basic state and the pop-up state 102 may be referred to as a pop-up state.

In the hide state 101 of the tire assembly 100, current is not applied to the variable portion 141. The variable portion 141 is in a low-temperature state since current is not applied to the variable portion 141 and there is no resistance heat (e.g., martensite state), and in this state, a shape of the variable portion 141 may be transformed by elastic force of the elastic member 170. That is, resistance to shape deformation of the variable portion 141 in a low-temperature state is lower than that of the elastic member 170.

In the hide state 101 of the tire assembly 100, the variable portion 141 may be pressed in an inward direction ID toward a central axis (C) by the elastic member 170 to contact with a side surface 1171 of the first groove 117. The variable portion 141 may be transformed so that a portion thereof contacts with the side surface 1171 and the other portion thereof contacts with a flat portion 1173 of a bottom surface 1174. For example, in the hide state 101, the variable portion 141 may be transformed to an 'L' shape. In the hide state 101, the contact portion 142 may be located inwardly of a surface of the tire 120 and hidden as the variable portion 141 is transformed in a state in contact with the side surface 1171.

In the pop-up state 102 of the tire assembly 100, current is applied to the variable portion 141 through the slip ring 160. For example, the control unit CU of the vehicle may supply current to the variable portion 141 based on a user input U for transforming the tire assembly 100 to the pop-up state 102. Since current is applied to the variable portion 141, resistance heat is generated, so that the variable portion 141 is in a high-temperature state (e.g., austenite state), and in this state, the variable portion 141 may recover to an original shape thereof by overcoming elastic force of the elastic member 170. That is, in a high-temperature state, shape restoring force of the variable portion 141 may be greater than the elastic force of the elastic member 170.

In the pop-up state 102 of the tire assembly 100, the variable portion 141 may contact with an entire bottom surface 1174 of the first groove 117 while compressing the elastic member 170 in an outward direction OD, opposite to an inward direction ID. The variable portion 141 may be restored to an original shape thereof so that a portion of the variable portion 141 in contact with the side surface 1171 in the hide state 101 contacts with a curved portion 1172 of the bottom surface 1174. For example, in the pop-up state 102, the variable portion 141 may be restored to a 'J' shape. That is, a shape of the variable portion 141 in the pop-up state 102 is an original shape, and a shape of the variable portion 141 in the hide state 101 is a transformed shape. The variable portion 141 may move along the first groove 117 by a predetermined length L in an outward direction OD while being restored to the original shape thereof. As the variable portion 141 moves in the outward direction OD, in the pop-up state 102, at least a portion of the contact portion 142 may move along with the variable portion 141 by a predetermined length L to protrude further than a surface of the tire 120.

When driving a vehicle provided with the tire assembly 100 according to an exemplary embodiment of the present disclosure, the driver may change the tire assembly 100 to a hide state 101 or a pop-up state 102 in response to road conditions or driving conditions through a user input U (e.g., a button pushing operation). For example, when driving on a general road, driving with the tire assembly 100 in the hide state 101, and driving on snowy or icy roads, the tire assembly 100 may be change to the pop-up state 102 through a button pushing operation, or the like.

Figures 9A, 9B:
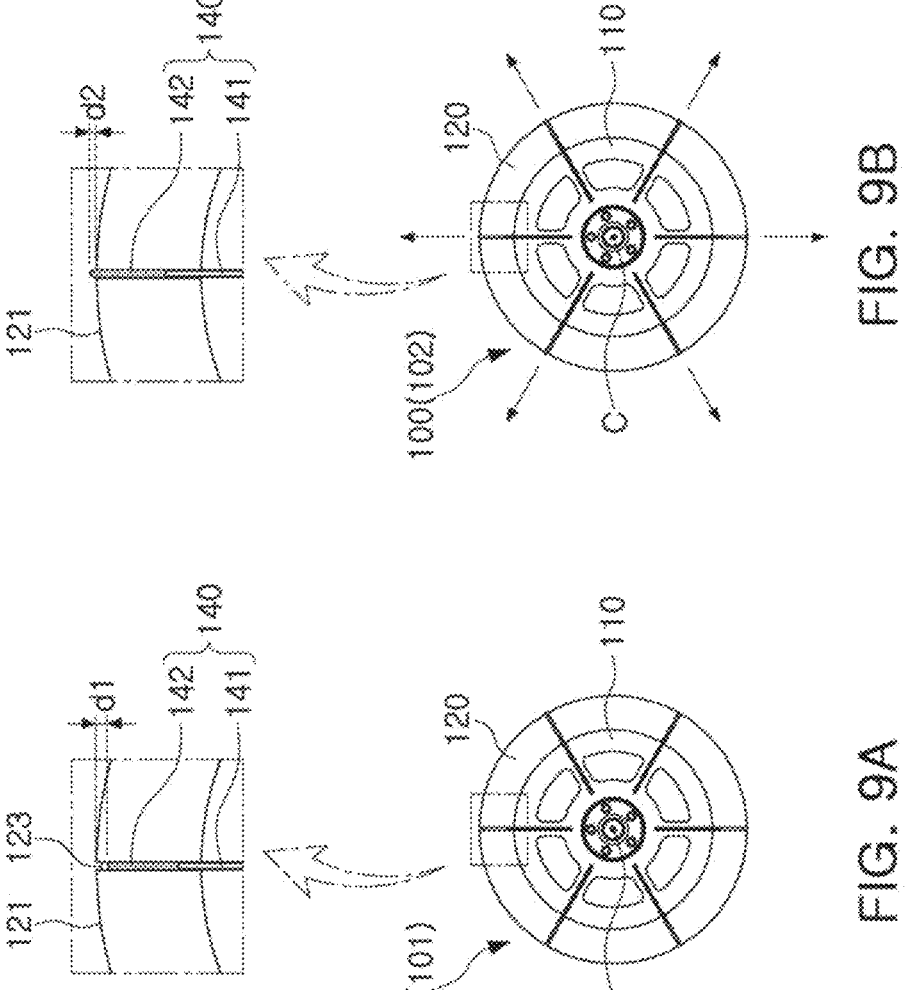
FIG. 9A and FIG. 9B are views exemplarily illustrating a hide state and a pop-up state of a tire assembly according to an exemplary embodiment of the present disclosure.

FIG. 9A and FIG. 9B are views exemplarily illustrating a hide state 101 and a pop-up state 102 of a tire assembly 100 according to an exemplary embodiment of the present disclosure.

FIG. 9A illustrates a hide state 101 of the tire assembly 100, and FIG. 9B illustrates a pop-up state 102 of the tire assembly 100.

Referring to FIG. 9A and FIG. 9B, the tire assembly 100 according to an exemplary embodiment of the present disclosure is transformable between the hide state 101 and the pop-up state 102.

As shown in FIG. 9A, the tire assembly 100 is configured so that a contact portion 142 does not contact with the ground when driving in the hide state 101. In the hide state 101, the contact portion 142 of the anti-skid member 140 may be located inwardly of a surface of a tread 121 of a tire 120 (e.g., in a direction of a central axis (C)) by a first distance d1. In the tire assembly 100 in the hide state 100, because the contact portion 142 is located inwardly of the surface of the tire 120, like other tire grooves, a first groove 117 may provide a function of increasing a frictional force between the tire 120 and the ground. For example, the first groove 117 may function as a tire groove including a depth of the first distance d1 from the surface of the tread 121.

As shown in FIG. 9B, the tire assembly 100 is configured so that the contact portion 142 contacts with the ground when driving in a pop-up state 102. For example, when the tire assembly 100 is transformed from the hide state 101 to the pop-up state 102, the anti-skid member 140 may move outwardly (e.g., in an opposite direction of the direction of a central axis (C)) along a first groove 117 of the wheel 110 and a second groove 123 of the tire 120. In the pop-up state 102, the contact portion 142 of the anti-skid member 140 may protrude outwardly of the surface of the tread 121 of the tire 120 by a second distance d2. When in the pop-up state 102, the contact portion 142 is configured as a snow chain by contacting with the ground. The first distance d1 and the second distance d2 may be the same as or different from each other.

FIG. 9B illustrates an exemplary embodiment in which the contact portion 142 protrudes from the surface of the tire 120 in the pop-up state 102. However, various embodiments of the present disclosure are not limited to the illustrated examples. According to various exemplary embodiments of the present disclosure, the contact portion 142 may form the same surface as the surface of the tire 120 in the pop-up state 102. For example, the contact portion 142 may be continuously connected to the surface of the tire 120 in the pop-up state 102.

The tire assembly 100 according to an exemplary embodiment of the present disclosure provide a function for a driver to recognize a degree of wear of the tire 120. When the tire 120 is worn over a certain level, the contact portion 142 of the anti-skid member 140 may form the same surface as the surface of the tire 120 even though the tire assembly 100 is in the hide state 101, and accordingly, it may contact with the ground while driving. For example, when the tire 120 is continuously worn based on the hide state 101 shown in FIG. 9A, the first distance d1 approaches zero, and even when the tire assembly 100 drives in the hide state 101, the contact portion 142 can contact with the ground. The driver can feel the feeling of driving or riding when the contact portion 142 contacts with the ground, and can easily know when to replace the tire 120.

As set forth above, according to an exemplary embodiment of the present disclosure, an anti-skid member may be integrally provided in a tire assembly to hide or pop-up the anti-skid member through a driver operation, so that the anti-skid member may be easily utilized without a process of installing or separating an anti-skid member on or from the tires of a vehicle.

Furthermore, according to an exemplary embodiment of the present disclosure, by forming an actuator for moving the anti-skid member using a shape memory alloy, it is possible to simply implement parts of the tire assembly.

Furthermore, according to an exemplary embodiment of the present disclosure, when the anti-skid member contacts with the ground according to tire wear, a driver can easily recognize when it is time to change tires.

The aforementioned description merely illustrates the technical concept of the present disclosure, and a person skilled in the art to which an exemplary embodiment of the present disclosure pertains may make various modifications and modifications without departing from the essential characteristics of the present disclosure.

In addition, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A tire assembly, comprising:
a wheel connected to a vehicle, and including a first groove formed in the wheel;
a tire coupled to the wheel, and including a second groove connected to the first groove; and
an anti-skid member including first and second end portions coupled to the wheel, and movably accommodated in the first groove and the second groove,
wherein the tire includes a tread contacting with the ground and a sidewall extending from first and second sides of the tread and coupled to the wheel, and
wherein the tire assembly is configured to transform to a hide state in which at least a portion of the anti-skid member is located inwardly of a surface of the tread or to a pop-up state in which the at least a portion of the anti-skid member protrudes from the surface of the tread.

2. The tire assembly of claim 1,
wherein the anti-skid member includes a variable portion accommodated in the first groove and a contact portion coupled to the variable portion and accommodated in the second groove, and
wherein the variable portion includes a shape memory alloy.

3. The tire assembly of claim 2, wherein the contact portion is configured for contacting with the ground when the tire assembly is in the pop-up state.

4. The tire assembly of claim 2, wherein the contact portion is formed using at least one of a plastic material, a non-woven fabric material, and a metal material.

5. The tire assembly of claim 2, wherein a first end portion of the variable portion is fixed to the wheel, and a second end portion of the variable portion, opposite to the first end portion of the variable portion, is coupled to the contact portion.

6. The tire assembly of claim 5, wherein a first end portion of the contact portion is coupled to the second end portion of the variable portion and a second end portion of the contact portion opposite to the first end portion of the contact portion is fixed to the wheel.

7. The tire assembly of claim 2,
wherein the sidewall of the tire includes a first sidewall extending from a first side of the tread and a second sidewall extending from a second side of the tread,
wherein the second groove extends to across the first sidewall, the tread, and the second sidewall, and
wherein a partial section of the second groove formed in the first sidewall is connected to the first groove.

8. The tire assembly of claim 7, wherein the contact portion includes a first portion accommodated in a first section of the second groove formed in the tread, a second portion accommodated in a second section of the second groove formed in the first sidewall, and a third portion accommodated in a third section of the second groove formed in the second sidewall.

9. The tire assembly of claim 8,
wherein in the hide state, the second portion of the contact portion is accommodated inwardly from the surface of the tread by a first distance, and
wherein in the pop-up state, the second portion of the contact portion protrudes outwardly from the surface of the tread by a second distance.

10. The tire assembly of claim 2,
wherein a shape of the variable portion is transformed or restored based on whether an electrical signal is applied to the variable portion, and
wherein the contact portion is movable with respect to the tire in response to whether the shape of the variable portion is transformed or restored.

11. The tire assembly of claim 10,
wherein in the hide state, the electrical signal is cut off and the variable portion is transformed to a predetermined shape by external force, and in the pop-up state, the electrical signal is applied to overcome the external force applied to the variable portion and thus the variable portion is restored to an original shape of the variable portion, and
wherein the variable portion moves the contact portion while at least a portion of the variable portion moves in a direction away from a central axis of the wheel along the first groove by the restoration of the shape.

12. The tire assembly of claim 11, further including:
an elastic member provided to apply the external force to the variable portion,
wherein the wheel includes an accommodating groove connected to the second groove and in which the elastic member is accommodated, and
wherein the elastic member applies elastic force to the variable portion in a direction toward the central axis.

13. The tire assembly of claim 11, wherein the first groove is formed in a shape corresponding to an original shape of the variable portion to support the variable portion in the pop-up state.

14. The tire assembly of claim 2, further including:
a slip ring fixed to the wheel and connected to the variable portion to transmit an electrical signal to the variable portion.

15. The tire assembly of claim 2, further including:
a fixing ring for fixing the contact portion to the wheel.

16. The tire assembly of claim 2, further including:
a cover detachably coupled to the wheel,
wherein the cover is provided to cover the variable portion and the first groove.

17. The tire assembly of claim 1,
wherein the anti-skid member is comprised in plural, and
wherein the first groove and the second groove are formed in a number equal to the anti-skid member.

18. A vehicle, comprising:
an axle; and
a tire assembly coupled to the axle,
wherein the tire assembly includes,
a wheel connected to the axle, and including a first groove formed in the wheel;
a tire coupled to the wheel, and including a second groove connected to the first groove; and
an anti-skid member including first and second end portions coupled to the wheel, and movably accommodated in the first groove and the second groove,
wherein the tire includes a tread contacting with the ground and a sidewall extending from first and second sides of the tread and coupled to the wheel, and
wherein the tire assembly is configured to transform to a hide state in which at least a portion of the anti-skid member is located inwardly of a surface of the tread or to a pop-up state in which the at least a portion of the anti-skid member protrudes from the surface of the tread.

19. The vehicle of claim 18, further including:

a control unit of controlling state transformation of the tire assembly in response to a driver operation.

20. The vehicle of claim 19, wherein the anti-skid member further includes a variable portion accommodated in the first groove and made of a shape memory alloy, and a contact portion coupled to the variable portion and accommodated in the second groove, wherein the control unit is electrically connected to the variable portion and provided to apply an electrical signal to the variable portion, and wherein a shape of the variable portion is transformed or restored based on whether the electrical signal is applied to the variable portion, and the contact portion is movable with respect to the tire in response to whether the shape of the variable portion is transformed or restored.

* * * * *